June 17, 1958        J. A. CHEZEM        2,838,770
BED COVER RETAINER ASSEMBLY
Filed July 18, 1955        2 Sheets-Sheet 1
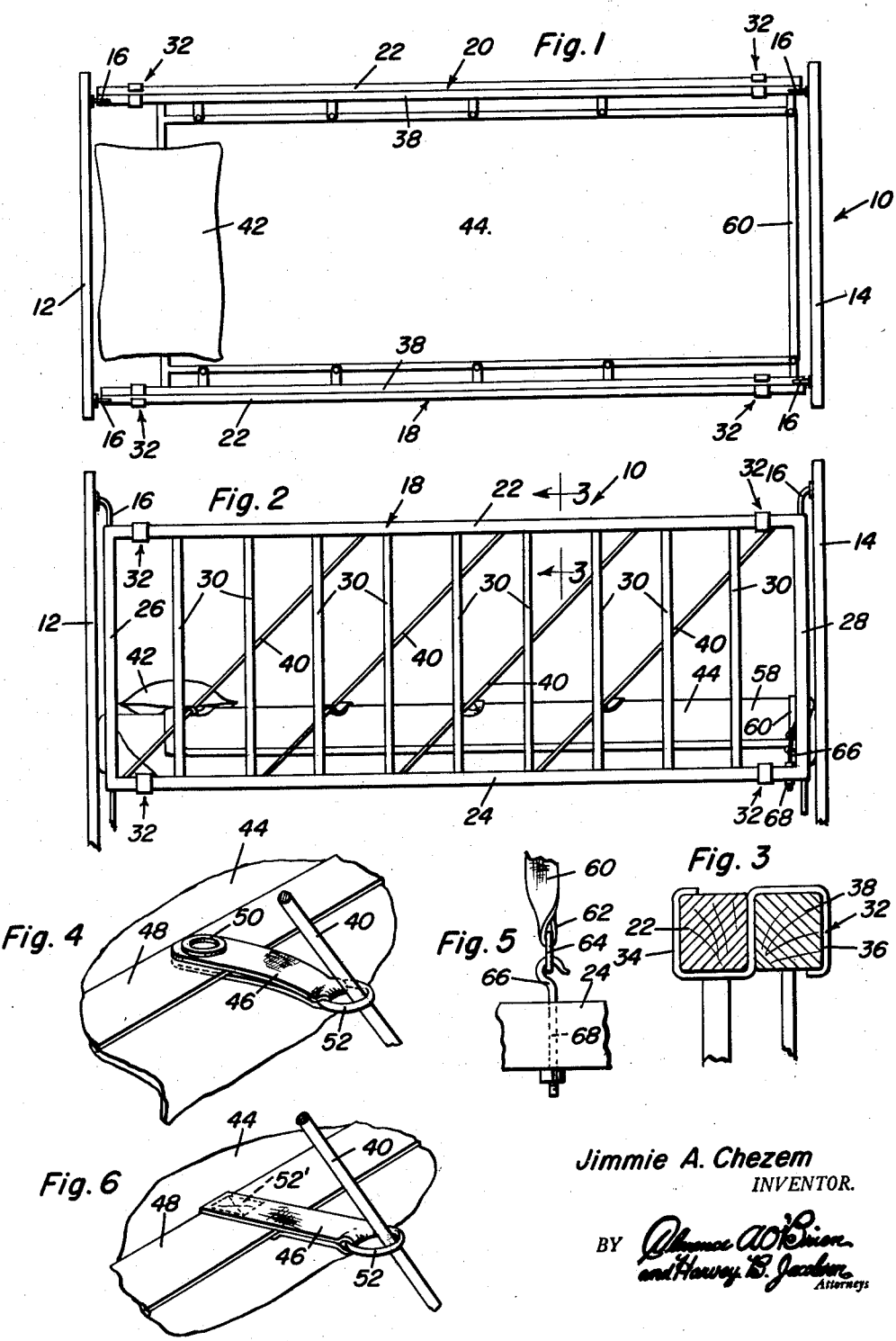
Jimmie A. Chezem
INVENTOR.

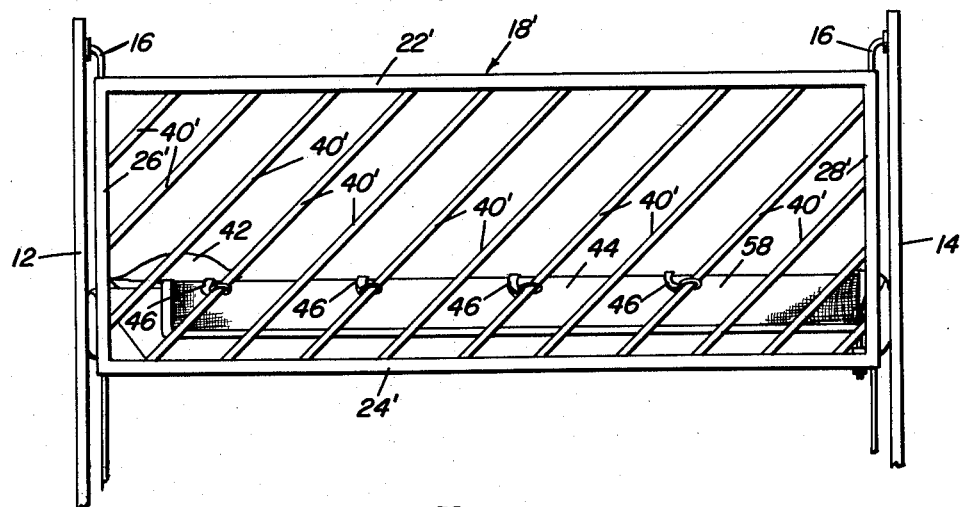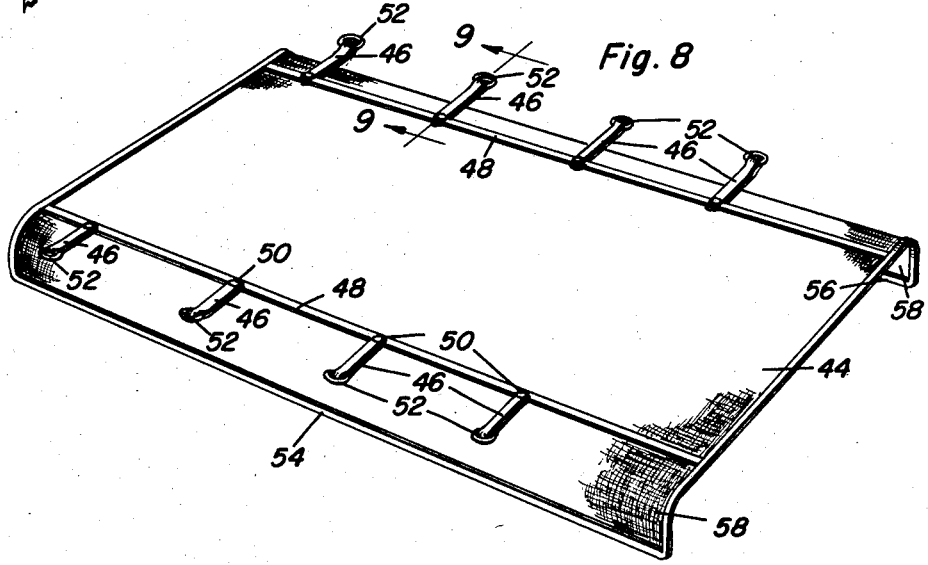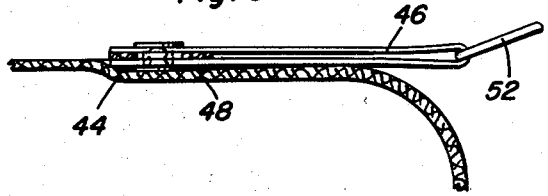

United States Patent Office 2,838,770
Patented June 17, 1958

2,838,770

BED COVER RETAINER ASSEMBLY

Jimmie A. Chezem, Sarasota, Fla.

Application July 18, 1955, Serial No. 522,631

2 Claims. (Cl. 5—320)

This invention relates generally to beds and the like and is more particularly concerned with a novel bed cover retainer assembly and including means for retaining a bed covering such as blankets, quilts and the like in an overlying protective position relative to an occupant of a bed permitting ready removal of the covering for the occupant, such as an infant, invalid etc., as well as means incorporated on said bed permitting maximum freedom of movement of the occupant while in position beneath the retained bed cover.

A further object of invention in conformance with that set forth above is to provide on a bed including a pair of oppositely disposed side frame portions including upper and lower rail members, a plurality of upwardly extending mutually parallel guide elements extending at an acute angle away from the head of the bed toward the foot, and including guide means on a bed cover member which are secured thereon in spaced relationship, said guide means comprising ring elements, each of which being slidably received upon one of the guide elements permitting the cover member to be readily moved upwardly from the occupant on the bed and retaining the bed cover member in an overlying covering position relative to the occupant of the bed but yet providing relative freedom of movement therebeneath.

A still further object of invention is to provide a bed cover retaining assembly of the character set forth which is readily and economically manufactured, easily installed and maintained, and highly efficient and readily acceptable for the purpose intended.

These together with other objects and advantages which will become subsequently apparent reside in the details of construction and operation as more fully hereinafter described and claimed, reference being had to the accompanying drawings forming a part hereof, wherein like numerals refer to lige parts throughout, and in which:

Figure 1 is a top plan view of an infant's crib showing the novel bed cover retaining assembly installed;

Figure 2 is a side elevational view of an infant's crib showing the novel bed cover retaining assembly in position;

Figure 3 is an enlarged sectional view taken substantially on line 3—3 of Figure 2, showing the clamp means for maintaining an elongated support on one of the side rails;

Figure 4 is a perspective view showing a guide ring element slidably retained on one of the upwardly directed angularly extending guide elements of the invention;

Figure 5 is an enlarged fragmentary elevational view showing the manner of retaining one of the ends of a restraining strap for securing the end of a covering member at the foot of a bed;

Figure 6 is a perspective view similar to Figure 4 showing another embodiment of guide ring and its manner of attachment to a bed covering;

Figure 7 is a side elevational view of a baby crib showing the upwardly extending angularly related guide elements being incorporated in the side frames of the crib;

Figure 8 is a perspective view of a bed covering member showing the guide ring elements being secured inwardly of opposite side edge portions of the bed covering member providing draft flaps; and Figure 9 is an enlarged perspective view taken substantially on line 9—9 of Figure 8.

Indicated generally at 10 is a bed which includes a head member 12 and foot portion 14 having thereon at opposite edge portions vertically extending guide rail portions 16 which support vertically adjustable side frames 18 and 20, said side frames including upper and lower rail members 22 and 24 connected by means of suitable vertically extending end members 26 and 28 and intermediate rung elements 30.

The just described structure is that typical of an infant's crib, and although the invention is described relative to the infant's crib it is to be understood that the bed covering retaining assembly may be utilized with other type beds, the only requisite being that they incorporate vertically extending side frames.

An S-shaped clamp 34 has one portion extending about the side rail members 22 and 24, the other portion 36 of which extending around elongated support members 38. The frame members 38 have extending therebetween suitable angularly related mutually parallel support elements 40 which extend upwardly from the lower rail members 24 upwardly toward the upper rail members 22 and toward the foot of the bed which is opposite to that indicated by the pillow at 42.

A covering member such as a blanket, quilt, etc., is indicated at 44 and includes in spaced relationship adjacent edge portions thereof elongated flexible strap elements 46 which may be secured to a suitable tape portion 48 extending longitudinally of the blanket by means of suitable fastening elements 50 of any suitable character. The strap elements 46 have secured thereto guide ring elements 52 which are slidably received upon the guide elements 40. The restraining strap elements 46 are secured by means of the fasteners 50 inwardly of the outer side edges 54 and 56 of the cover member to provide an anti-draft flap 58 which is extendable between a mattress of the crib and the side frame portion thereof. The tape portion 48 of the covering member may include therein suitable weights, such as lead sinkers which tend to urge the covering into an overlying position relative to the mattress of the crib.

Indicated in Figure 6 is a flexible element 46 which is secured by means of sewing 52' to the covering member 44.

The covering member 44 may be secured to a crib by means of a flexible retaining strap 60 which has a loop 62 at opposite end portions in which is secured a ring element 64, said ring element 64 being removably received within the hook portion 66 of a bolt element 68 extending through the foot portion of the crib in the lower rail portions 24 of the frames of the crib.

Indicated in Figure 7 is a frame member 18' which is secured to vertically extending guide rail portions 16 of the head and foot members 12 and 14, respectively of a crib, the side frame 18' including upper and lower rail portions 22' and 24' being suitably connected by means of vertically extending end members 26' and 28' which have suitably connected therebetween angularly related upwardly extending guide elements 40' which comprise an integral part of the side frame and serve the same function as the guide elements 40 of the previously described embodiment cooperating with the covering member 44 in the same manner as previously described.

The use of the bed covering retaining assembly is readily apparent from the previously described description, and accordingly further explanation is believed unnecessary. However, it is believed readily apparent that the bed covering 44 may be readily moved upwardly away from an occupant beneath said covering, the blanket or quilt readily returning into a covering position overlying the occupant in the crib or bed, and movement while sleeping is not prohibited by the ring 44 which will readily move upwardly on the guide elements 40 or 40'.

Various positional directional terms such as "front," "rear," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a bed including a pair of oppositely disposed side frames having upper and lower rail members extending between head and foot portions of the bed, a plurality of mutually parallel elongated guide elements extending upwardly and at an acute angle at the head of the bed toward the foot thereof between upper and lower rail members of the side frames, a cover extending transversely between said frames, and a plurality of spaced oppositely disposed guide rings secured on opposite side edges of said cover, each of said guide rings being slidably received on one of the upwardly extending guide elements, said guide element being flexible and having a guide ring secured at one end, the other end of said ring being secured in inwardly spaced relation relative to an opposite side edge of the cover.

2. A bed as set forth in claim 1 and including a transverse retaining strap element extendable over the foot end portion of the cover, opposite ends of said strap being removably secured to opposite portions of the lower rail member of the frame.

References Cited in the file of this patent

UNITED STATES PATENTS

| | | |
|---|---|---|
| 777,016 | France | Dec. 6, 1904 |
| 2,129,487 | Bleier | Sept. 6, 1938 |
| 2,343,587 | Seigelbaum | Mar. 7, 1944 |
| 2,637,047 | Zurzolo | May 5, 1953 |

FOREIGN PATENTS

| | | |
|---|---|---|
| 110,294 | Sweden | Apr. 11, 1944 |